United States Patent
Bevilacqua et al.

(10) Patent No.: US 10,007,491 B2
(45) Date of Patent: Jun. 26, 2018

(54) SYSTEMS AND/OR METHODS FOR CLOUD-BASED EVENT-DRIVEN INTEGRATION

(71) Applicant: Software AG USA, Inc., Reston, VA (US)

(72) Inventors: Michael Ellis Bevilacqua, Englewood, CO (US); Dobromir Karamelski, Frankfurt am Main (DE)

(73) Assignee: SOFTWARE AG USA, INC., Reston, VA (US)

( * ) Notice: Subject to any disclaimer, the term of this patent is extended or adjusted under 35 U.S.C. 154(b) by 687 days.

(21) Appl. No.: 14/574,794

(22) Filed: Dec. 18, 2014

(65) Prior Publication Data
US 2016/0182652 A1 Jun. 23, 2016

(51) Int. Cl.
*H04L 29/08* (2006.01)
*G06F 8/34* (2018.01)
*G06F 9/54* (2006.01)
*G06F 9/451* (2018.01)
*G06F 9/44* (2018.01)

(52) U.S. Cl.
CPC ............... *G06F 8/34* (2013.01); *G06F 9/546* (2013.01); *G06F 9/4446* (2013.01); *G06F 9/453* (2018.02); *H04L 67/10* (2013.01); *H04L 67/327* (2013.01)

(58) Field of Classification Search
CPC .......... G06F 8/34; G06F 9/546; G06F 9/4446; H04L 67/327; H04L 67/10; H04L 67/16
See application file for complete search history.

(56) References Cited

U.S. PATENT DOCUMENTS

| 8,326,876 | B1 * | 12/2012 | Venkataraman | G06F 17/3056 707/759 |
| 2008/0189440 | A1 * | 8/2008 | Goyal | H04L 29/06 709/248 |
| 2009/0328070 | A1 * | 12/2009 | Paknad | G06Q 10/06 719/318 |
| 2014/0095541 | A1 * | 4/2014 | Herwadkar | G06F 17/30442 707/774 |
| 2014/0328189 | A1 * | 11/2014 | Fallon | H04L 67/2804 370/252 |

(Continued)

OTHER PUBLICATIONS

About IFTTT, retrieved Dec. 17, 2014, pp. 1-2. https://ifttt.com/wtf.

(Continued)

*Primary Examiner* — Arvin Eskandarnia
*Assistant Examiner* — Juan C Turriate Gastulo
(74) *Attorney, Agent, or Firm* — Nixon & Vanderhye PC

(57) ABSTRACT

Certain example embodiments relate to systems and/or methods for cloud-based event-driven integration, which in essence inverts the current point-to-point integration pattern by using an event-driven system in its place. Certain example embodiments transform and normalize integration patterns in connection with an underlying framework that helps decouple data producers from data consumers and advantageously allows additional systems to simply "plug into" the framework. Data from event sources is transformed into an event with a well-defined event type that may be picked up by an event sink, transformed into a format relevant for that event sink, and subsequently processed.

16 Claims, 10 Drawing Sheets

(56) References Cited

U.S. PATENT DOCUMENTS

| | | | |
|---|---|---|---|
| 2015/0127670 A1* | 5/2015 | Torman | G06F 17/30345 707/755 |
| 2016/0056993 A1* | 2/2016 | Harishankar | H04L 41/069 709/224 |
| 2016/0098563 A1* | 4/2016 | Sharma | G06F 21/577 726/25 |

OTHER PUBLICATIONS

DELL Boomi—Technical Overview, retrieved Dec. 17, 2014, pp. 1-2. http://www.boomi.com/integration/technical_overview.
David Chou, "Using Events in Highly Distributed Architectures," The Architecture Journal, retrieved online Dec. 17, 2014, pp. 1-5. http://msdn.microsoft.com/en-us/library/dd129913.aspx.

\* cited by examiner

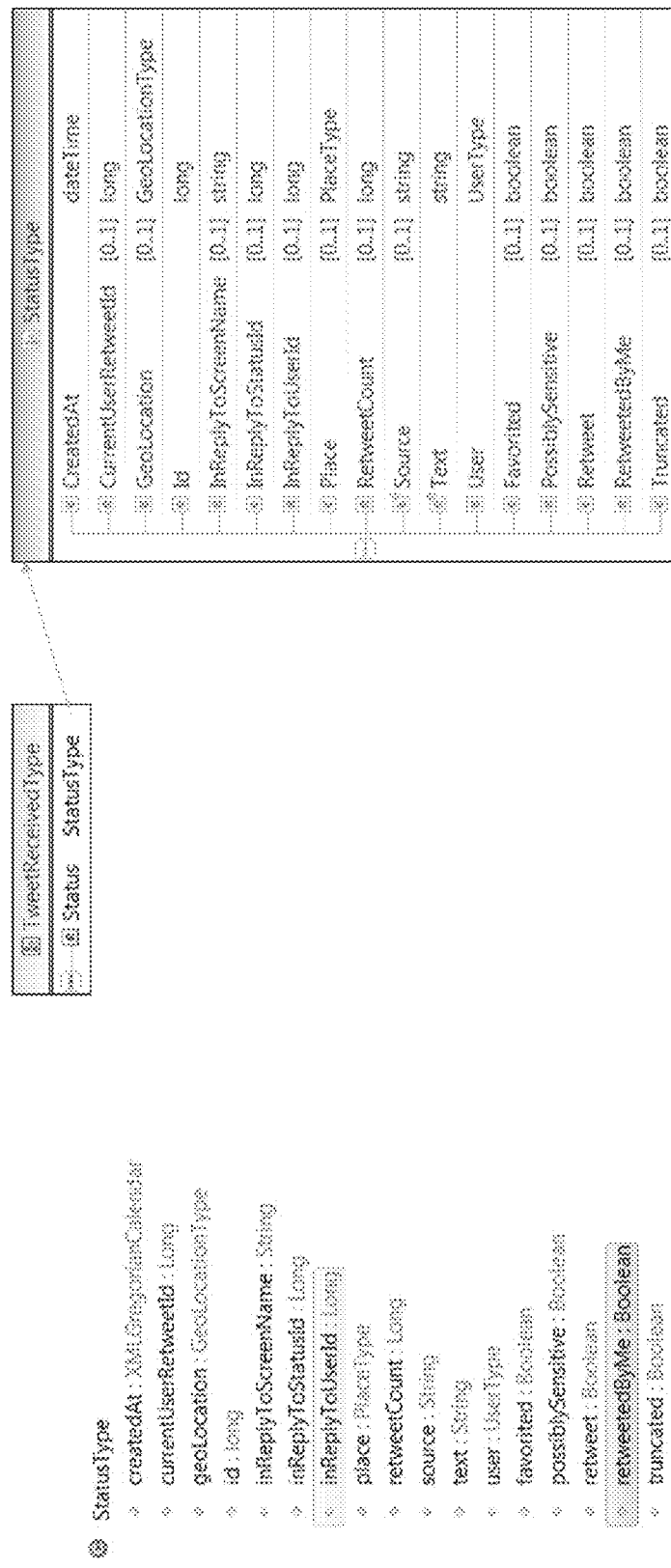

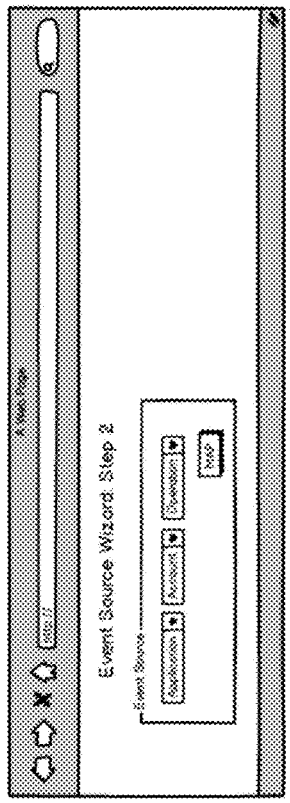
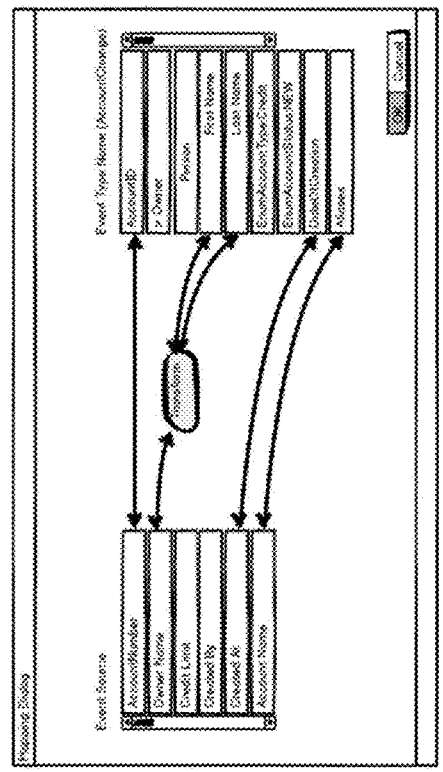
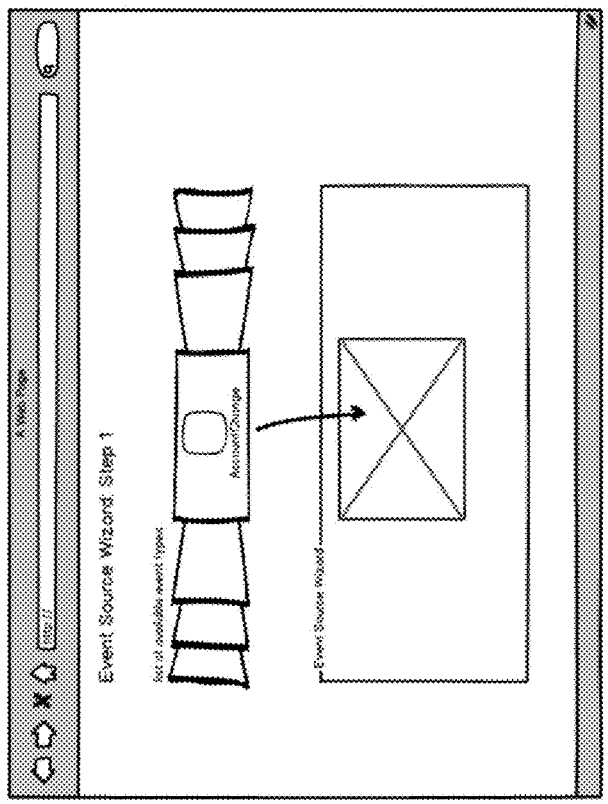
Fig. 5b
Fig. 5c
Fig. 5a

SYSTEMS AND/OR METHODS FOR CLOUD-BASED EVENT-DRIVEN INTEGRATION

TECHNICAL FIELD

Certain example embodiments described herein relate to systems and/or methods for integration architectures. More particularly, certain example embodiments described herein relate to systems and/or methods for cloud-based event driven integration (CBEDI) frameworks in which, among other things, an event bus receives normalized events that correspond to produced event source data and provide such normalized events to event sinks connected thereto that are able to interpret and further process the same.

BACKGROUND AND SUMMARY

Integration platforms can be a factor in driving business agility, and the rise of software-as-a-service (SaaS), platform as a service (PaaS), cloud computing, and other distributed computing environments, has created new paradigms of integration.

The initial industry reaction has been to build point-to-point service-based integrations to help meet integration needs, in these and related contexts. Indeed, most (if not all) commercially available cloud integration offerings are based on synchronous execution of a point-to-point connection or orchestration flow. In this approach, each integration flow is customized for the implicated endpoints. As will be appreciated by those skilled in the art, an endpoint may be thought of in certain instances as being a representation of a point that can send and/or receive commands and data, e.g. as a service provider or in a message exchange, and examples include the Salesforce cloud product with its remote interfaces in the form of REST or SOAP services, common message processors like queues and topics in a publish/subscribe messaging model, etc.

As will be appreciated by those skilled in the art, integration systems often require a common set of information to be distributed across many disparate systems, which implies a many-to-many relationship between the systems that create the data and the systems that consume the data. Unfortunately, then, implementing these requirements by using a point-to-point integration pattern can result in a complex dependency network that is very difficult (if not impossible) to manage, maintain, and/or scale.

Certain example embodiments help address these and/or other concerns. For instance, certain example embodiments relate to systems and/or methods for cloud-based event-driven integration, which in essence inverts the current point-to-point integration pattern by using an event-driven system in its place (and/or overlaid thereon). Certain example embodiments transform and normalize integration patterns in connection with an underlying framework that helps decouple data producers from data consumers and advantageously allows additional systems to simply "plug into" the framework.

As will be appreciated from the more detailed description below, certain example embodiments help overcome current challenges in using event-driven integration techniques as a proper event routing framework "in the cloud." Even despite the current technological perspective, it is difficult (if not impossible) to implement a commercially feasible multi-tenant event bus connected to a transformation engine with sufficient power. Certain example embodiments thus provide an effective event-driven integration solution for the cloud and/or other emerging technologies that is generic in nature (e.g., not specifically limited to the cloud) in which, for example, the ability to receive and transmit data with events aids in the routing of that data in a loosely-coupled manner.

In certain example embodiments, there is a provided a cloud-based event driven integration information processing system that facilitates loosely-coupled communications between a plurality of source computing systems and a plurality of sink computing systems. A multitenant-aware event channel (e.g., an event bus) is configured to receive events, with each received event having a predefined event type. A repository is configured to store event type definitions that include mappings indicating how metadata associated with data from the source computing systems relate to attributes in corresponding event types. Tenant-specific execution nodes are backed by processing resources including at least one processor and a memory, with the execution nodes being controlled by their respective processing resources to at least: receive data from a given source computing system; identify an event type definition from the repository based on the received data and the given source computing system's identity; based on the identified event type definition, generate from the received data an event of a corresponding event type; and send the generated event to the event channel. The event channel is further configured to selectively provide for the sink computing systems the received events.

In certain example embodiments, there is a provided a cloud-based event driven integration information processing system that facilitates loosely-coupled communications between a plurality of source computing systems and a plurality of sink computing systems. A multitenant-aware event channel is configured to selectively provide for the sink computing systems the received events, with each event having a predefined event type. A repository is configured to store event sink definitions that indicate how attributes associated with event types relate to metadata usable by respective sink computing systems. Processing resources, including at least one processor and a memory, are configured to at least: receive a given event having a given event type; identify an event sink definition from the repository based on the received event and the identity of the sink computing system that will process the data associated with the given event; based on the identified event sink definition, process the received event to extract its data and metadata in a form usable by the sink computing system that will process the data associated with the given event; and enable processing of the extracted data and/or metadata by the sink computing system that will process the data associated with the given event. The event channel is further configured to receive events including data and attributes, directly or indirectly, from the source computing systems.

In certain example embodiments, a method of managing a cloud-based event driven integration information processing system that facilitates loosely-coupled communications between a plurality of source computing systems and a plurality of sink computing systems is provided. The method includes providing: a multitenant-aware event channel configured to receive events, with each received event having a predefined event type; a first repository configured to store event type definitions that include mappings indicating how metadata associated with data from the source computing systems relate to attributes in corresponding event types; a second repository configured to store event sink definitions that indicate how attributes associated with event types relate to metadata usable by respective sink computing systems; and a plurality of tenant-specific execution nodes backed by first processing resources including at least one processor and a memory. The execution nodes are able to at least: receive data from a given source computing system; identify an event type definition from the repository based on the received data and the given source computing system's identity; based on the identified event type definition, generate from the received data an event of a corresponding event type; and send the generated event to the event channel. The event channel is further able to selectively provide for the sink computing systems the received events by at least: receiving a given event having a given event type; identifying an event sink definition from the repository based on the received event and the identity of the sink computing system that will process the data associated with the given event; based on the identified event sink definition, processing the received event to extract its data and metadata in a form usable by the sink computing system that will process the data associated with the given event; and enabling processing of the extracted data and/or metadata by the sink computing system that will process the data associated with the given event.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 3a and 3b are example event type definitions for a Twitter status update, which may be used in connection with certain example embodiments;

FIG. 5a-5c are views of an event source wizard and helping dialogs that may be used in certain example embodiments;

DETAILED DESCRIPTION

Figure 1:
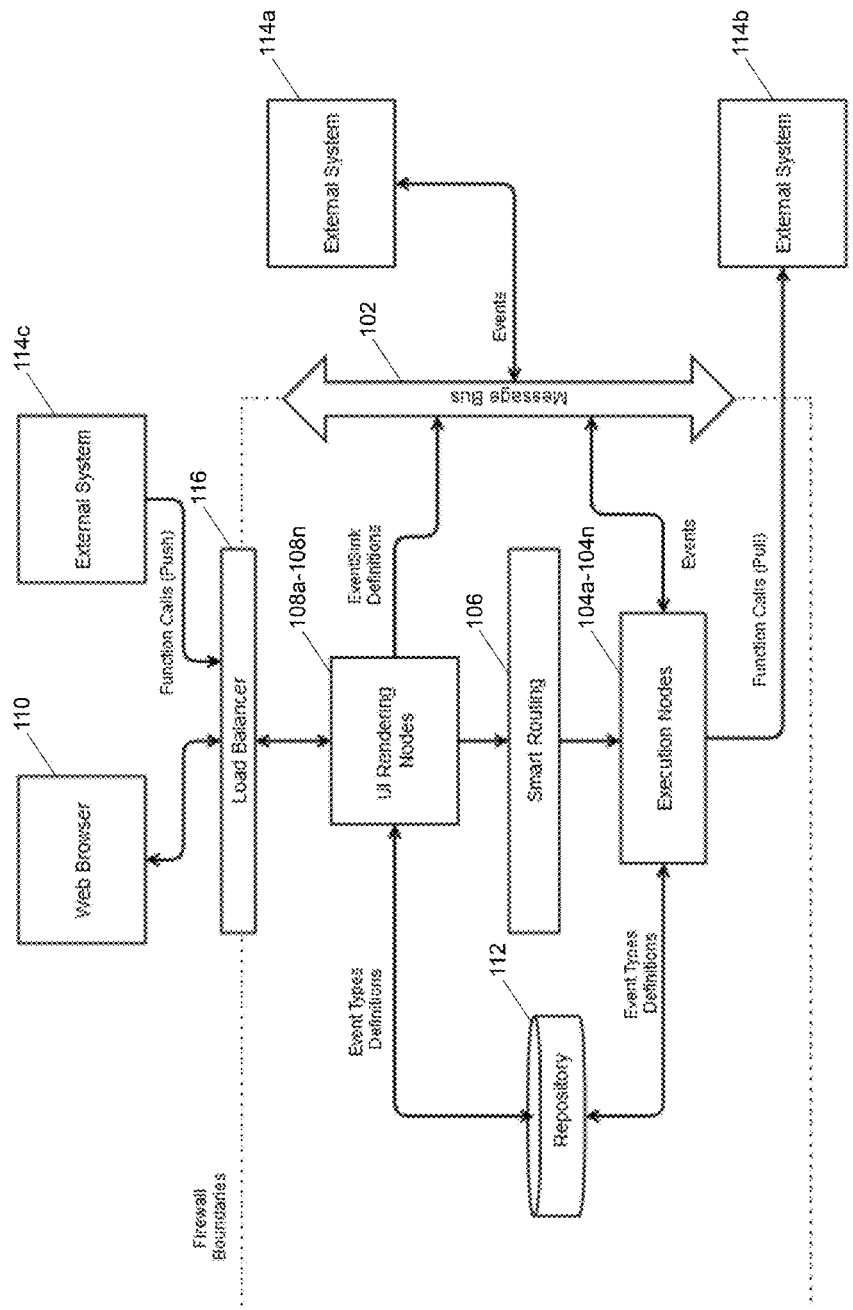
FIG. 1 is a block diagram illustrating certain components of an example cloud-based event driven integration (CBEDI) framework, in accordance with certain example embodiments.

Certain example embodiments relate to a cloud-based event-driven integration (CBEDI) approach that in certain example instances allows users to connect any combination of cloud, software-as-a-service (SaaS), on-premises, and/or other applications by means of events. In certain example embodiments, communications among and/or between such applications may take place in the absence of any customer-owned appliances, customer-managed software, and/or customer-developed code. As alluded to above, this CBEDI capability is based on an eventing pattern of integration, e.g., as opposed to a more traditional and formalistic service pattern. In this regard, the event-driven integration approach employed by certain example embodiments may implement a loosely-coupled design that is easy to extend, evolve, and maintain, thereby providing users with more flexibility and reduced maintenance requirements. To aid in understanding, the term "on-premises" is used herein to denote a system that is not in the same network as the cloud service. This may, for example, be a system that is in a corporate network that is running in a datacenter owned by that corporation.

Events and event driven architecture (EDA) systems in general are well-known concepts to those skilled in the art. However, as alluded to above and as will become clearer from the description below, the CBEDI systems and/or methods of certain example embodiments go well beyond conventional EDA usage, e.g., in solving certain problems that exist as a result of technical advances in emerging environments such as, for example, cloud computing.

In this regard, in certain example embodiments, the CBEDI approach for integration of data sources (providers) and data sinks (interested consumers) uses events to control the communication across a complex cloud network in a completely different way compared to existing point-to-point mechanisms. The CBEDI approach of certain example embodiments ties the cloud-based service and its ability to transmit and receive data with events that enable the efficient routing in a loosely-coupled manner. According to certain example embodiments, events are used in combination with the data in that the events are created and intelligently routed to enable the correct parts of the data to reach the correct consumers in a loosely-coupled fashion such that it becomes easy to add new data sources and data sinks to the integration without an understanding of or modifications to the entire landscape).

The CBEDI approach of certain example embodiments provides and coordinates several components with specifically programmed capabilities. These components may include or otherwise relate to, for example, event sources, event sinks, an event-type editor, and an event processing framework.

With respect to event sources, the CBEDI techniques of certain example embodiments provide the ability to define a component that generates event objects in response to perceived information and transfers generated event objects to a connected event channel. An event source need not necessarily know the end-recipient(s) of the event object, nor need it necessarily know how the event object is to be used or further processed by any such recipients. In fact, an event source need not even know if there even is a recipient in existence. Loose coupling of or in the system therefore may be realized.

In certain example embodiments, an event source may actively generate an event at the time of its occurrence, e.g., without a request from another component. The CBEDI framework may use connectors to define event sources. Connectors may facilitate connections to a vast and ever-increasing variety of sources and/or source types such as, for example, Facebook and/or other social networking/media sites, weather systems, Salesforce applications, cloud-based email systems, etc. Endpoints defined using the connectors in webMethods Integration Cloud from Software AG may be used as event sources, for example.

Event sources may be identified to or otherwise defined in the CBEDI framework in certain example embodiments, along with their triggers, transformations/mappings, etc. (e.g., as discussed in greater detail below).

With respect to event sinks, the CBEDI techniques of certain example embodiments provide the ability to define components that receive events via an event channel and decide how to process received events according to their own program logic. Event sinks may be able to immediately process events at the time of receipt, and such processing may, for example, trigger an instantaneous execution of an operation. Therefore, reactions in real time may become possible. Similar to the above, the CBEDI framework may use connectors to define event sinks. Connectors in this sense may facilitate connections to a vast and ever-increasing variety of components interested in being notified of changes. Endpoints defined using the connectors available in webMethods Integration Cloud from Software AG may be used as event sinks, for example.

Event sink conditions may define the criteria under, and format in, which event sinks receive events. Event sink conditions may be tied to a defined action. An event sink condition may include a transformation that translates the data from the normalized data in the form of the event type to a form usable by the event sink. For example, it may map that data to some data structure that the event sink is able to handle. Another condition may place a filter on the data so that a process only executes on certain values in the data (e.g., data arriving within a certain time window, data with a sufficiently large sample size, etc.).

Event sinks may be identified to or otherwise defined in the CBEDI framework in certain example embodiments, along with their event sink conditions, transformations/mappings, etc.

An event-type editor may be used to define metadata about a given event. In the CBEDI framework, this metadata may including information about the event type. Integration may be facilitated by providing access to the metadata of an application, e.g., so that it can imported into the integration environment and reduce the need for the user to have to manually define the layout and format of application data, etc. Therefore, in the event-driven architecture pattern of certain example embodiments, the event type may be thought of as a decoupling point, and the event type itself may be thought of as being a specification for a set of event objects that have the same semantic intent and same structure. For example, a typical business may have the logical concept of "accountCreation," even though this creation could occur in many different systems with many different formats. A distinction, however, is that although this data may be semantically equivalent, it may be processed in a different format on different systems (and potentially on each different system). In certain example embodiments, a customer may use the event-type editor to create an event type that defines accountCreation to facilitate the processing. In this way, these event types may be thought of as being the building blocks for the cloud integration pattern of certain example embodiments.

As will be appreciated form the description below (e.g., in connection with FIGS. 8-9), certain example embodiments involve an architecture that has a very different type of event processing framework compared to existing point-to-point solutions. An example event processing framework is the NERV product available from Software AG. More generally, however, the CBEDI framework of certain example embodiments may provide the ability to define an ontology or, perhaps more simply, a set of rules or the like that can be applied to the event data to rapidly integrate applications based on events. As will be appreciated by those skilled in the art, an ontology may be thought of as being a formal naming convention and/or providing standard definitions of the types, properties, interrelationships, etc., of the entities that exist for the CBEDI framework. For instance, certain example embodiments may allow event sinks to state the conditions under which they would want to receive events. These conditions may be implemented using an ontology, a set of rules, or the like, that in essence applies filters to the integration, e.g., based on the data contained in the event. Examples of such rules or the like may involve identifying whether the event occurs at a certain time of day, contains a certain attribute in the event data, etc. "Rules" may be thought of as being one aspect of an ontological approach, and it will be appreciated that other ontological and/or other arrangements may be implemented in different example embodiments. In general, this or a similar approach may be used to facilitate automatic mappings, or at least automatic suggested mappings, in certain example embodiments.

Event sources may communicate events having identifiable event types into the cloud service using event source triggers, in certain example embodiments. Adapters may be used to connect external systems to the CBEDI in certain example embodiments. Adapters may in some instances be implemented as services that the external systems can invoke in order to provide data. It will be appreciated that there a number of different models may be used in connection with the execution of triggers. Examples include pull models, where the adapter in essence reaches out and fetches the data; push models, where there is a listener in some form of service (e.g., a REST or SOAP service) that receives the data from the external system; direct event models, where events are sent to the CBEDI message bus in a known message type (e.g., MQTT, JMS, etc.) or via a system that has the predefined event types; etc. Adapters are provided in the webMethods Integration Cloud offering, for example. If this offering is used, the Cloud Streams product mentioned above may be used to provide adapters for a pull model implementation. The integration server and its dynamic service creation capability may be used for a push model implementation.

Once the data arrives, the CBEDI framework may automatically transform it to an event as a form of event transformation. The transformation may be performed using predefined and/or dynamic mappings. For instance, a wizard may allow the user to map and transform incoming data to the event type that is to be later emitted. Using the wizard, fields from the actual data source may be mapped to the normalized field(s) represented by the data type. A transformation of the data (e.g., to alter its format, run an initial computation, dereference local or dynamically changing data, etc.) may be performed, as needed or as desired.

For purposes of illustration, it is noted that the example event type accountCreated discussed briefly above could have a structure that holds account owner names. The event type could have fields like "FirstName" and "LastName", while a data source could provide information for just one field entitled "AccountOwner". In that case, prior to mapping the fields, the full name obtained from the AccountOwner field may be split, and the result may be mapped to the FirstName and LastName fields. The mapping and transformation could be applied to all fields that come from the event source and could benefit from such a transformation.

As will be appreciated from the above, the conduit in or over which events are transmitted from event sources to event sinks may be referred to as an event channel. The facilities for correctly distributing the events may rely on (and potentially reside exclusively within) the event channel, in certain example embodiments. The various event sources for each event type may be routed through the same event channel in certain example embodiments. The process for creating an event source may help to ensure that the events in the channel will look exactly the same regardless of the event source. The event sink may be implemented as a message queue connected to the event bus in certain example embodiments.

Two high-level examples will now be provided to help provide context and understanding for the discussion of the detailed example implementations that follows. These examples involve a new account being created and a new photo being taken.

For the new account example, assume that a customer's information technology (IT) infrastructure runs many different systems in which accounts for customers could be created. These systems might include a Salesforce system, an SAP system, a billing system, a customer support system, etc. In addition, assume that the customer's IT infrastructure runs many different systems in which these new customer accounts need to be distributed when created. This may include the same four systems noted above, as well as additional interested systems such as, for example, a business intelligence warehouse that provides reporting functionality, a business activity monitoring (BAM) system that tracks new account creation compared to a business target, etc.

The event sources and event source triggers that are activated when a new account is created are identified. In this regard, the customer support system could be implemented to pull from a database table, and the Salesforce system could be implemented with a REST API call that informs the system of a new account. The inbound raw data from all involved systems is transformed from its original format into an empirical representation for an event with the event type named accountChanged. The event, once formed, is placed in the event channel named accountChanged.

The event sinks and the event types that the sinks are interested in receiving also are identified. In this vein, the user could identify the local SAP system, the SAP adapter for the connection, and the accountChange event type. The user also could define the data transformation patterns used in transforming the data from event type format to the SAP format. The SAP system does not need to know if the new account was created in the customer support system, in the Salesforce system, or elsewhere. Thus, the CBEDI provides independence and loose coupling between the event sources and the event sinks.

With respect to a second example, it will be appreciated that there are many photo sharing applications today that allow photos to be shared with a larger community such as, for example, Instagram, Facebook, Box, Flickr, Twitter, etc. Consider a pattern where a user can capture and share a photo in any one of these applications and elect to have the photo shared to all other photo sharing applications. Using the CBEDI framework of certain example embodiments, this functionality may be implemented by creating a newPhoto event type, standardizing all newPhoto events to an event type, and defining sources and sinks to route these events across the newPhoto channel. It will be appreciated that there is a paradigm shift in that the communication between all of the photo sharing applications is event-based rather than a series of point-to-point integrations, and that the former approach is easier to set up and maintain, scale, extend, etc., as compared to the latter.

Example Implementation

Referring now more particularly to the drawings, an example implementation will now be provided. FIG. 1 is a block diagram illustrating certain components of an example cloud-based event driven integration framework, in accordance with certain example embodiments. The cloud-based event driven integration framework of certain example embodiments may make use of available infrastructures such as, for example, those provided by the webMethods Integration Cloud project. The infrastructure may include a powerful messaging bus for example, such as that provided by Software AG Universal Messaging, and it may be connected to tenant aware Integration Servers such as, for example, Software AG's Integration Servers using its internal event interfaces.

In this regard, the message bus 102 of FIG. 1 helps form the event backbone and supports multitenant usage. The execution nodes 104a-104n are tenant specific, but it will be appreciated that they may be single or multitenant enterprise service bus (ESB) instances or the like. As ESB is a software architecture model oftentimes used in designing and implementing communication between mutually interacting software applications in a service-oriented architecture (SOA). If the ESB is not tenant aware, a smart routing module 106 may be used to route the calls to a tenant specific instance of an ESB. The user interface (UI) rendering nodes 108a-108n may be based on any appropriate server such as, for example, Apache Tomcat or the like. The UI nodes 108a-108n may help serve the multitenant web application used in defining the event types, the sinks, etc., as well as in the overall management of the system.

This multitenant web application may be accessible via a web browser 110 running on a computer system. The smart routing module 106 may in certain example embodiments be a routing mechanism that redirects the traffic to shared multitenant ESBs or dedicated ones, e.g., depending on the service level agreement (SLA) appropriate for the individual tenants. The smart routing helps ensure proper load balancing and availability of the execution nodes. In the case of single tenant ESB, for example, it may also help ensure correct routing to the specific node(s) for each tenant. In the case of a node failure, it also may help ensure correct failover.

As the rendering nodes 108a-108n are separated from the execution nodes 104a-104n, the UI can be build and made tenant aware. The execution nodes 104a-104n may aid in handling the transformations to the various event types and data processing flows (e.g., integration flows). In order to help ensure that the execution nodes 104a-104n nodes and/or the rendering nodes 108a-108n are reusable and can be easily recreated, tenant-specific assets (including event types and configurations, for example) are stored in an asset store or repository 112. The repository 112 may be implemented using Git or the like, although it will be appreciated that any suitable transitory or non-transitory computer readable storage medium(s) may be used in this regard.

It will be appreciated that the execution nodes 104a-104n nodes, rendering nodes 108a-108n, repository 112, etc., may be placed behind a firewall so that they are not directly accessible by external systems. Example firewall boundaries are shown in FIG. 1. It also will be appreciated that the execution nodes 104a-104n nodes, smart routing module 106, rendering nodes 108a-108n, etc., may be backed by any one or more computer processing systems including processing resources such as one or more computer processors, memory, non-transitory computer readable storage media, etc., in a cloud-based or other environment. Such computer processing systems may be transparent to the external systems shown in FIG. 1.

With respect to the latter, a plurality of external computing systems 114a-114c may be provided. Each system may be backed by processing resources of its own such as those discussed above. In the FIG. 1 example, a first external system 114a publishes events to the message bus 102 and may receive events from the message bus 102. It thus may be both an event producer and an event sink. A second external system 114b may receive events through pulls, and a third external system 114c may receive events through push function calls and/or the like (e.g., via a load balancer 116).

Figure 2:
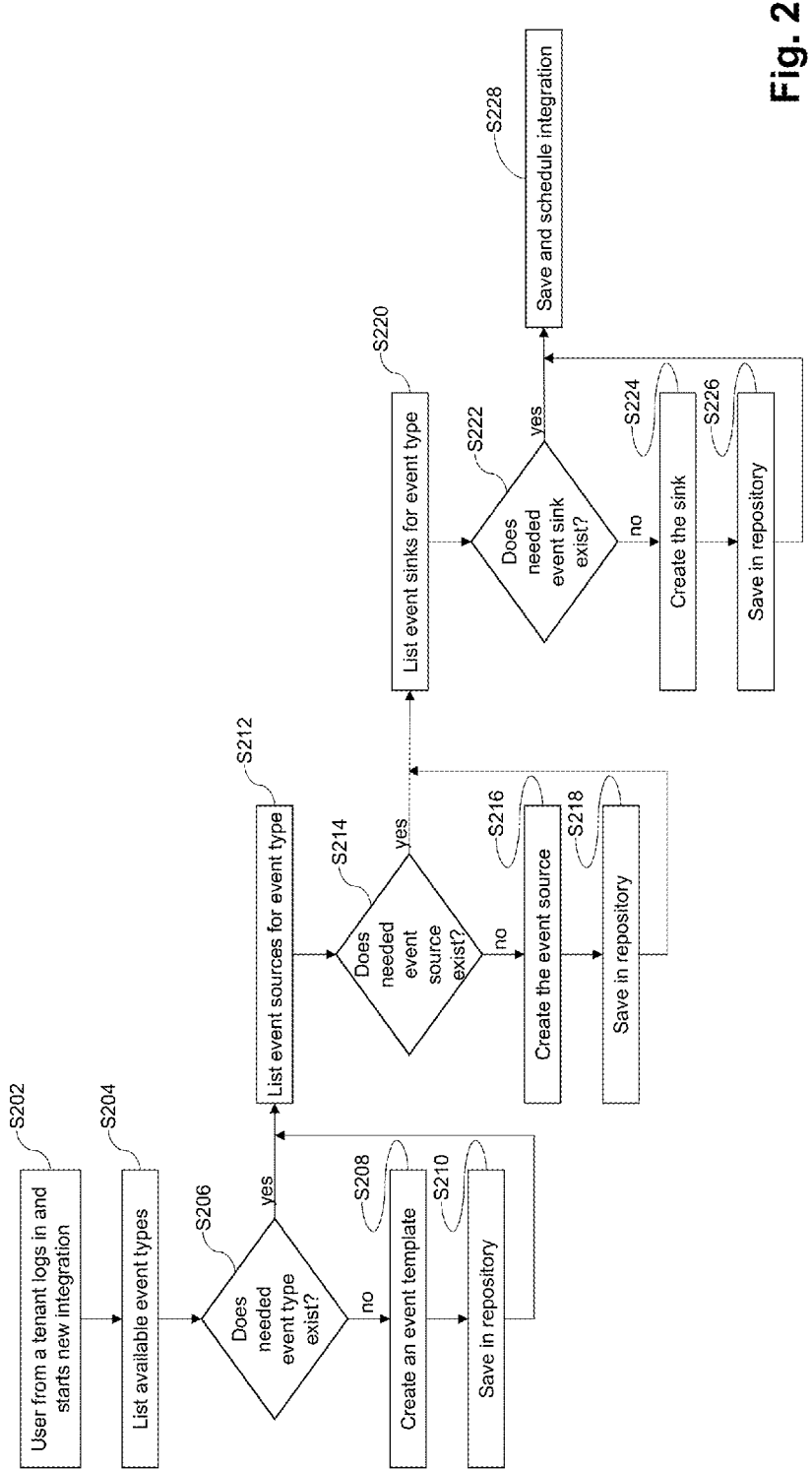
FIG. 2 is a flowchart showing a process for configuring the cloud-based event driven integration framework, in accordance with certain example embodiments.

FIG. 2 is a flowchart showing a process for configuring the cloud-based event driven integration framework, in accordance with certain example embodiments. In step S202, a user from a given tenant logs into the system using the web browser 110 and starts a new integration. As the UI for the configuration tool to be displayed via the web browser 110 is separated from the execution engine underlying the UI rendering nodes 108a-108n, it can be coded in multitenant fashion. Although this example is discussed in terms of creating a new integration with a single event source and event repository, because the sources and sinks are separated, the user can in other instances extend an existing integration, e.g., by adding one or more new sources and/or sinks, changing mappings, etc., in connection with a similar approach and flow.

With the event type wizard, the user can define the event types that will be used in a particular integration. In this regard, available event types for the new integration are listed in step S204. If a needed event type does not yet exist as determined in step S206, then a new event type template may be created in step S208, and the repository 112 may be updated accordingly in step S210. The event type may be automatically stored in a tenant-specific area of the repository 112, or in a tenant-specific instance of the repository 112 itself. Once stored, it may be used in other integrations.

If the needed event type does exist as determined in step S206, or after it has been created and saved in steps S208 and S210, then the user can use the event source wizard to user define and map incoming sources. In this regard, available event sources for the event type are listed in step S212. Similar to the above, if a needed event source does not yet exist as determined in step S214, then a new event source may be created or identified in step S216, and the repository 112 may be updated accordingly in step S218.

On the other hand, if the needed source does exist as determined in step S214, or after it has been created/identified and saved in steps S216 and S218, then the user can use the event sink wizard to user define and map outgoing data. In this regard, available event sinks for the event type are listed in step S220. Similar to the above, if a needed event sink does not yet exist as determined in step S222, then a new event sink may be created or identified in step S224, and the repository 112 may be updated accordingly in step S226.

If the needed event sink does exist as determined in step 222, or after it has been created/identified and saved in steps S224 and S226, then the integration is saved in step S228 and may be made active (e.g., if it is to use a push model, trigger on external events, etc.). If the integration is to pull the data, a scheduler may be defined and/or implemented, e.g., so that the data pull is triggered at the appropriate time(s) and/or under the appropriate circumstance(s).

As indicated above, an event type may be thought of as a metadata model that describes the data and may be specific to a tenant. A given event type may be edited in any suitable manner such as, for example, in a guided step-by-step approach in connection with a wizard. An editor additionally or in the alternative may allow the event type to be created more manually, e.g., using an XML schema as a template, using Java classes as a template, by providing an actual operation signature, etc. An event type editor may, for example, normalize the data that can be received and emitted from and to various endpoints. Predefined event types also may be provided for known events in the landscape in certain example embodiments.

Common binding patterns may be used to transform physical event types into different physical formats such as, for example, an XML schema, a JSON schema, Java classes, and/or the like. FIGS. 3a-3b are example event type definitions for a Twitter status update, which may be used in connection with certain example embodiments. FIG. 3a shows a Java class representation, whereas FIG. 3b shows an XML schema representation. It will of course be appreciated that this event type may be represented in these and/or other ways, and that other event types may be implemented in connection with these and/or other different representations.

Figure 4B:
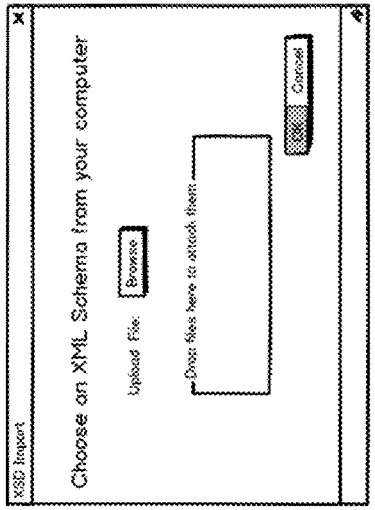
FIGS. 4a-4c are views of an event type wizard and helping dialogs that may be used in certain example embodiments.
Figure 4C:
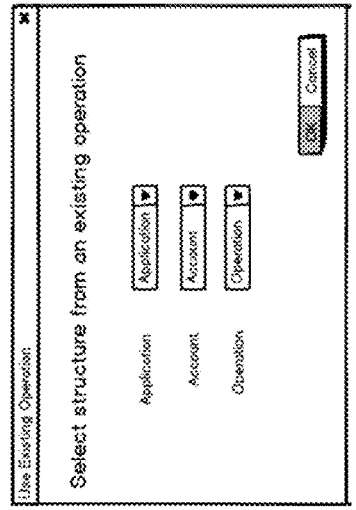
Figure 4A:
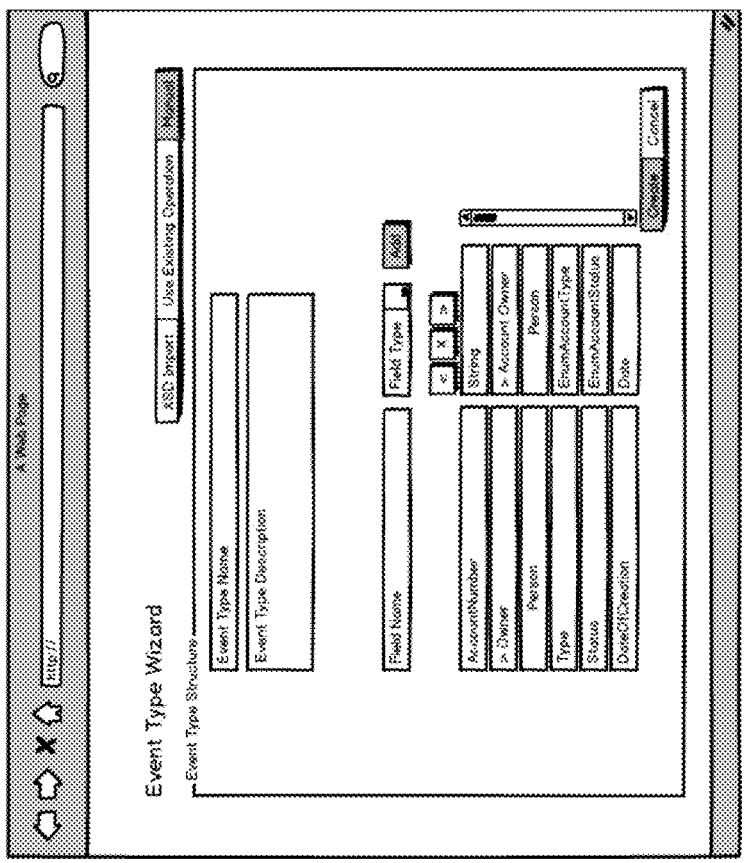

FIGS. 4a-4c are views of an event type wizard and helping dialogs that may be used in certain example embodiments. In this example, the helping dialog window in FIG. 4b allows the user to provide an XML schema (e.g., in XSD or other form) from the user's computer, and the helping dialog widow in FIG. 4c allows the user to use an operation signature as a template for the event type. The main wizard page in FIG. 4a allows the user to edit the tree-like structure of an event type. Fields can be added, deleted, moved up and down (e.g., using drag and drop operations), made children of/parents to other fields, etc. With respect to the latter, a key capability may be provided, e.g., so that parent nodes optionally may be declared as including lists of children. For example, one account could be associated with a list of addresses rather than only one, and key functionality could help in establishing this hierarchical one-to-many or many-to-many (or other) cardinality.

Once the event type is declared and the user initiates the creation of a new event type (or the saving of an edited event type), the new (or updated) event type will be stored with other assets in the repository. As alluded to above, an asset repository server backing the repository may be configured to include one repository per tenant, and all integration flows and event types may be stored in it. The execution nodes may be configured to keep themselves up-to-date by consulting the repositories appropriate for their tenants, e.g., so that event type definitions, etc., are retrieved as needed. This may be accomplished by dynamically consulting the repository when an event is to be processed, periodically (e.g., as a part of a synchronization process), automatically (e.g., when the repository is updated), manually (e.g., when triggered by a user), etc.

When completed, the event types are ready to be used in the event-driven integration.

Similar to FIGS. 4a-4c, FIGS. 5a-5c are views of an event source wizard and helping dialogs that may be used in certain example embodiments. This example wizard, or similar functionality, may be implemented to help identify the sources for the defined event type data. The event sources each use a specific connector for the external system to trigger the action to emit the data as an event. The schemas shown in FIGS. 3a-3b may be used as event types for the events emitted by the event source for Twitter-related event sources, etc.

As another example perhaps more closely related to the discussion above in connection with FIGS. 4a-4c, and as shown in FIG. 5a, for example, an account change event type may be selected for further event source identification. The FIG. 5b helper dialog may be used to identify the application, account, and operation for the event source associated with the event type. In FIG. 5c, the wizard displays a mapping dialog to allow the event source format to be mapped to the event type format. FIG. 5c shows mappings between the event source fields and fields in the event type. Transformations may be defined here, as well. For instance, in the FIG. 5c example, a single owner name field is split into two fields corresponding to a person's first and last names.

As a result of this step, the CBEDI framework knows how to route the data into the event channel. It will be appreciated, however, that the event source does not need to know (and may not know) the recipient of the event object. In this scenario, the event source does not even know (or need to know) if a recipient exists and, if one does, it does not know (or need to know) how the event object is used or further processed. In this way, loose coupling of the system is realized. It will be appreciated that there can be many operations that feed events into the same event channel. While such operations may logically take place using one channel, the functionality may be implemented using multiple parallel physical channels in certain example embodiments.

Similar to FIGS. 5a-5c, FIGS. 6a-6c and 7a-7c are views of an event source wizard and helping dialogs that may be used in certain example embodiments. The event sink uses a trigger to generate the response when an event enters the event channel. The sinks are defined in a wizard similar to the event source wizard. The functionality of FIGS. 6a-6b and 7a-7b will be understood as being generally analogous to the description above. Also similar to the above, the event sink wizard displays a mapping dialog in FIG. 6c to allow the event type format to be mapped to the event sink source format. The mapping involves the event type, and even before this operation, the CBEDI is able to handle routing the data into the event channel. The event sink may not care who sent the message. Instead, it may simply need to know that the data is there and that it should be reacted to in some particular in-build or programmed manner. In this way, loose coupling of the system may be realized. There can be many event sink operations that react to a single event entering an event channel in different example embodiments.

The concept of an event sink can be further extended with data policies and/or the like. One example involves a sink that is interested in AccountChanges, yet is not permitted to view Personally Identifiable Information (PII) such as, for example, the account owner's first and last name. The map step in CBEDI may support this requirement. See FIG. 6c in this regard.

Figure 6A:
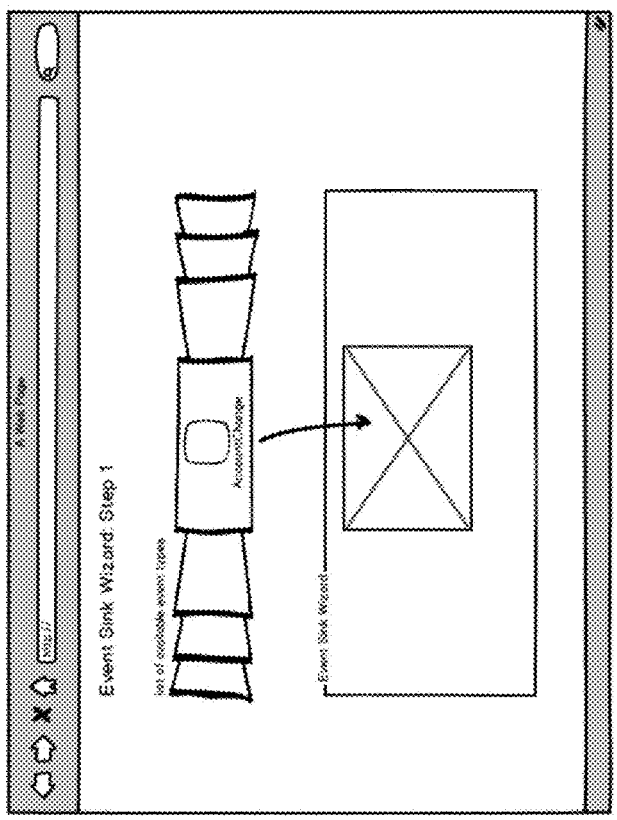
FIGS. 6a-6c and 7a-7c are views of an event sink wizard and helping dialogs that may be used in certain example embodiments.
Figure 6B:
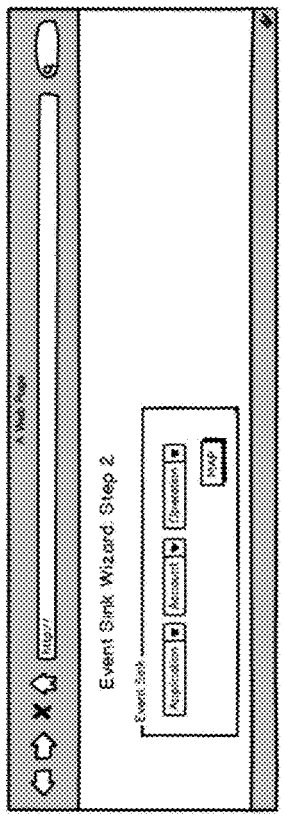
Figure 6C:
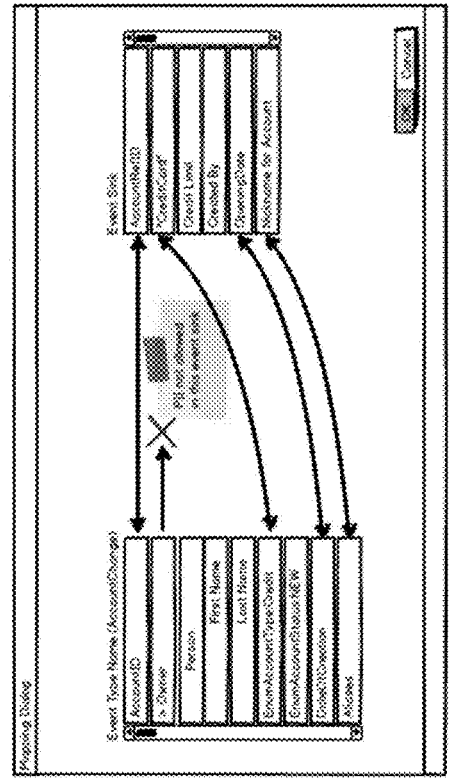
Figure 7B:
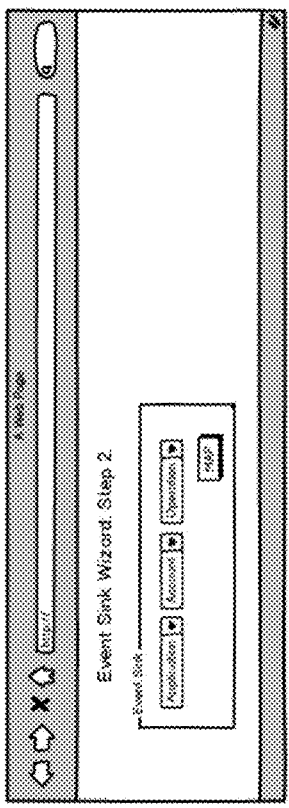
Figure 7C:
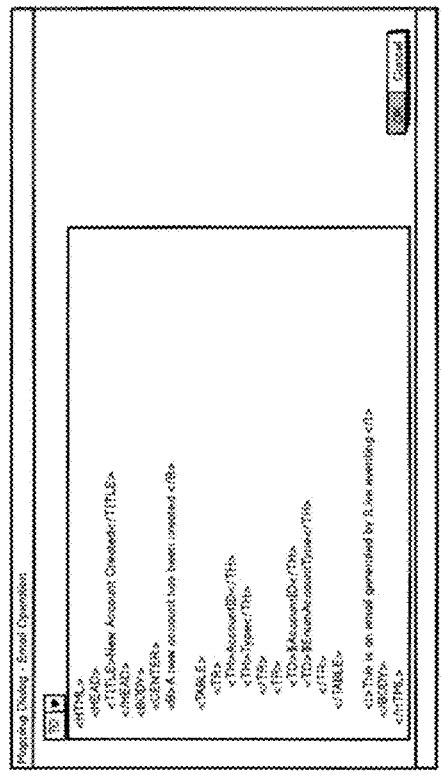
Figure 7A:
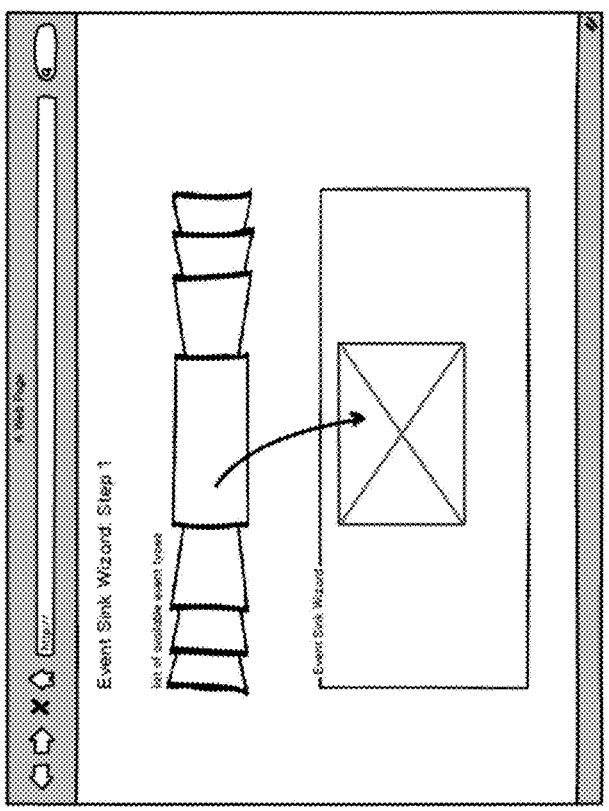

FIG. 6c shows a sort of schema-to-schema mapping as may be used in connection with certain example embodiments. It will be appreciated, however, that the mapping may be performed more manually. For example, custom coding may be performed. In this regard, FIG. 7c shows HTML code for an email message that is to be generated and sent based on the trigger.

Figure 8:
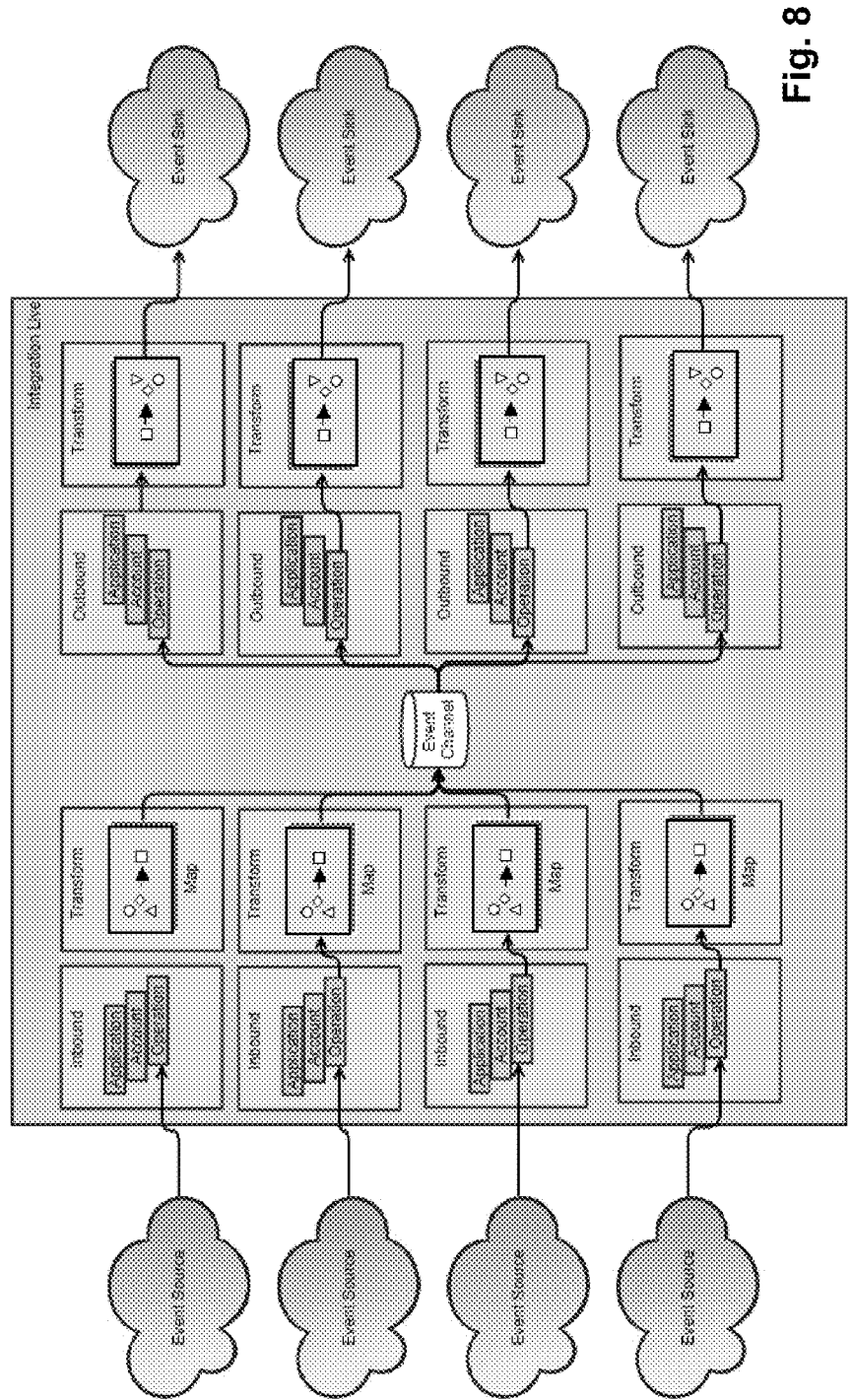
FIG. 8 is a simplified CBEDI architecture and data flow in accordance with an example embodiment.

FIG. 8 is a simplified CBEDI architecture in accordance with an example embodiment. More particularly, FIG. 8 involves a data flow from four event sources to four event sinks. The data is semantically the same but in different formats in each source system. The flow of data moves from the cloud-based sources via an inbound trigger operation, is normalized via mapping operations, and placed into the event channel. Once on the event channel, the data now represented in event form is reacted to by outbound operations and sent to cloud-based sinks. The addition of a sink or source advantageously involves the definition of only one new integration flow (and in some cases, the new flow may be copied from or patterned off of an existing flow).

Figure 9:
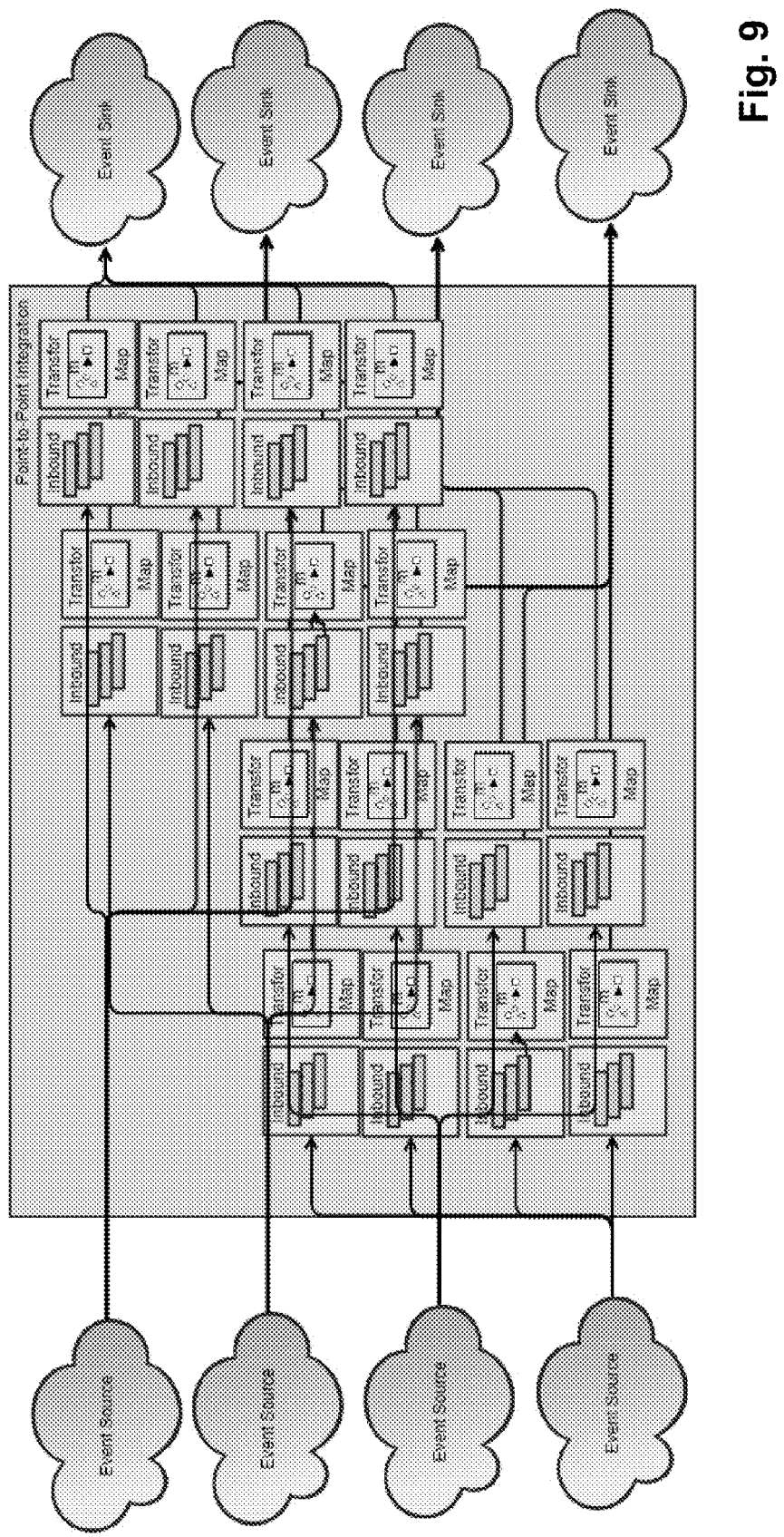
FIG. 9 illustrates a data flow similar to that in FIG. 8, except in a current point-to-point architecture.

FIG. 9 illustrates a data flow similar to that in FIG. 8, except in a current point-to-point architecture. That is, FIG. 9 shows data flows from four event sources to four event sinks. Although the data being shared is semantically the same, the point-to-point integration architecture unfortunately requires a specific implementation between each of the sixteen (i.e., 4 source×4 sink) relationships. Each additional event sink or source could require four new integration flows to be defined. The simplification possible using the CBEDI approach thus can be readily appreciated.

Figure 10:
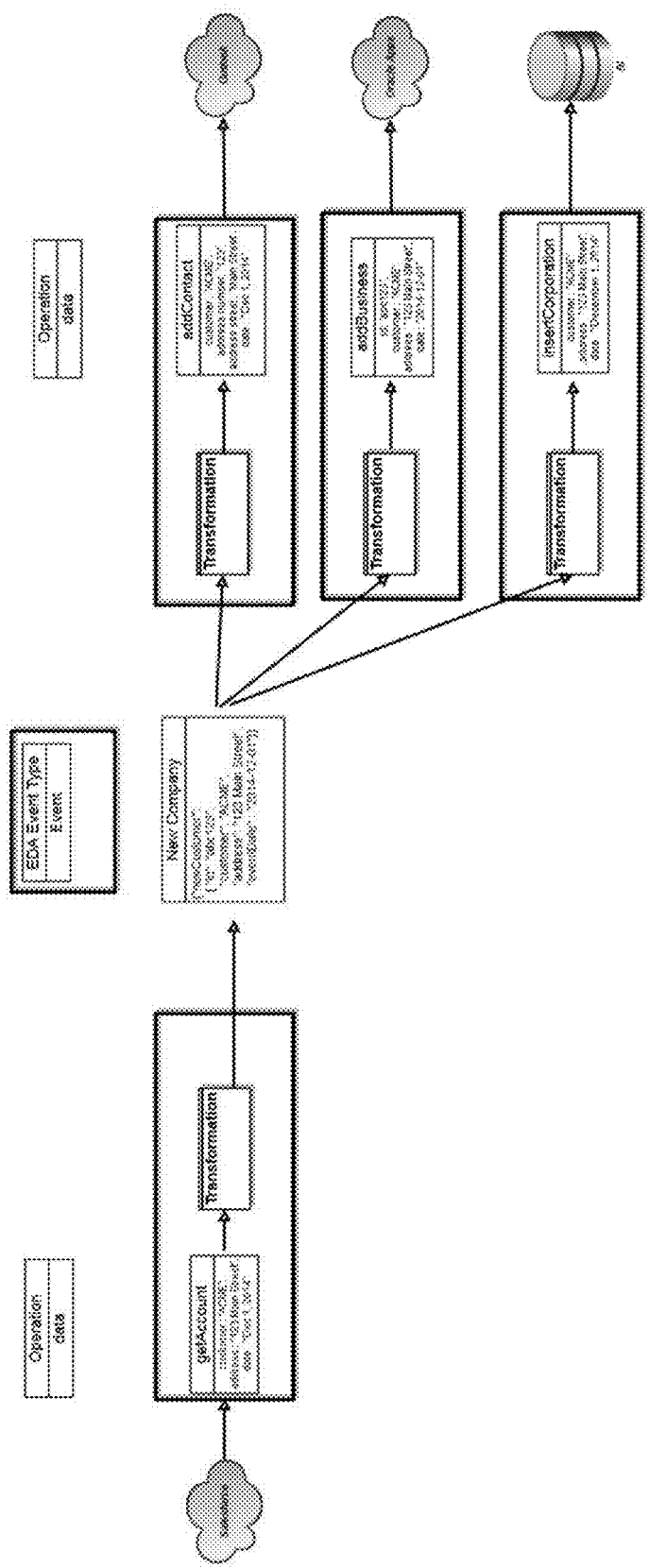
FIG. 10 shows another example data flow in accordance with certain example embodiments.

FIG. 10 shows another example data flow in accordance with certain example embodiments. The FIG. 10 example is more concrete than the FIG. 8 example in that it shows a Salesforce event source and Microsoft Outlook, Oracle Apps, and some business intelligence system event sinks interacting in connection with a new account being created. The Salesforce event source provides account data that is transformed into a normalized event that is published as a new company event type on the event channel. The Microsoft Outlook, Oracle Apps, and business intelligence database event sinks are connected to the channel and receive the normalized event (e.g., because they subscribe to related message topics, pull such events, etc.). The normalized event is then transformed for each event sink. For example, for the Microsoft Outlook sink, the event is treated as an addContact operation. The now transformed data may be provided to the event sinks. Additional event sources and/or sinks can be added to the integration without requiring an understanding of or modifications to the entire landscape.

As can be seen, then, the existing point-to-point, service-based approach of FIG. 9 does not work well in this cloud-based environment, in part because it is so difficult to maintain and extend. By contrast, the approach taken in FIGS. 8 and 10 uses events to facilitate a loosely coupled system for communication (e.g., in a cloud-based or other distributed environment) that enables additional event sources and sinks to be added to the integrated environment without requiring an understanding of the integrated environment and without modification of the entire landscape. In addition, the complexity of connections between data sources and data sinks that would be necessary using the existing FIG. 9 mechanism is significantly reduced.

It will be appreciated that normalization operations, transformations from events, etc., may be performed in a distributed manner, e.g., in connection with adapters at the endpoints, at least in certain example embodiments. In certain other example embodiments, some or all of this and/or other functionality may be more centralized in the framework.

Although certain example embodiments are described in connection with data that is semantically the same but in different formats in each source/sink system, it will be appreciated that the semantics may be wholly or only partially the same. For instance, different events with different event types based on the same source data may include the same or different data. Similarly, a sink may take all or only some of the information provided in a particular event, even though other sinks may take the same or different data.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cloud-based event driven integration information processing system that facilitates loosely-coupled communications between a plurality of source computing systems and a plurality of sink computing systems in connection with a cloud-inclusive integration system, the system comprising:
   a multitenant-aware event channel configured to receive events, each received event having a predefined event type, wherein the event channel is deployed to the integration system;
   a repository configured to store event type definitions that include mappings indicating how metadata associated with data from the source computing systems relate to attributes in corresponding event types; and
   a plurality of tenant-specific execution nodes backed by processing resources including at least one processor and a memory, the execution nodes being controlled by their respective processing resources to at least:
      receive data from a given source computing system,
      identify an event type definition from the repository based on the received data and the given source computing system's identity,
      based on the identified event type definition, generate from the received data an event of a corresponding event type, and
      send the generated event to the event channel, regardless of whether the given source computing system is internal to the cloud, wherein generated events are generated by the cloud-based event driven integration information processing system to (a) transform, normalize, and replace point-to-point integration patterns to decouple data producers and data consumers that otherwise would be linked together via those point-to-point integration patterns, and (b) allow tenant-aware integration patterns to generically plug into the cloud-based event driven integration information processing system,
   wherein the event channel is further configured to selectively provide for the sink computing systems the received events, regardless of whether the sink computing systems are internal to the cloud, to facilitate the loosely-coupled communications;
   wherein at least some of the source computing systems and at least some of the sink computing systems are external to the cloud-inclusive integration system; and further comprising:
   a routing module configured to route calls away from tenant unaware execution nodes and instead to one or more tenant-specific execution node instances.

2. The system of claim 1, further comprising event sink definitions that indicate how attributes associated with event types relate to metadata usable by respective sink computing systems.

3. The system of claim 2, further comprising a plurality of rendering nodes configured to generate tenant-specific user interface instances.

4. The system of claim 3, wherein the user interface is programmed to enable a user to define a new event type, and associate source and/or sink computing systems with the newly defined event type.

5. The system of claim 4, wherein the user interface is programmed to enable the user to generate new event type definitions based on the newly defined event type and the associated source computing system(s).

6. The system of claim 4, wherein the user interface is programmed to enable the user to generate new event sink definitions based on the newly defined event type and the associated sink computing system(s).

7. The system of claim 3, the rendering nodes are separated from the execution nodes.

8. The system of claim 1, wherein events from the event channel are communicable to the sink computing systems via push, pull, and direct event models.

9. The system of claim 1, wherein the event type definitions are tenant specific.

10. The system of claim 9, wherein a tenant-specific repository includes a plurality of tenant-specific stores that store respective tenant-specific event type definitions.

11. The system of claim 1, wherein the repository stores event types for semantically equivalent data that is to be processed differently on different sink computing systems.

12. A cloud-based event driven integration information processing system that facilitates loosely-coupled communications between a plurality of source computing systems and a plurality of sink computing systems in connection with a cloud-inclusive integration system, the system comprising:
   a multitenant-aware event channel configured to selectively provide for the sink computing systems received events, each received event having a predefined event type;
   a repository configured to store event sink definitions that indicate how attributes associated with event types relate to metadata usable by respective sink computing systems; and
   processing resources, including at least one processor and a memory, configured to at least:
      receive a given event having a given event type,
      identify an event sink definition from the repository based on the received event and the identity of the sink computing system that will process the data associated with the given event, based on the identified event sink definition, process the received event to extract its data and metadata in a form usable by the sink computing system that will process the data associated with the given event, and enable processing of the extracted data and/or metadata by the sink computing system that will process the data associated with the given event, regardless of whether the given sink computing system is internal to the cloud, wherein the event channel is further configured to receive events including data and attributes, directly or indirectly, from the source computing systems, regardless of whether the source computing systems are internal to the cloud, to facilitate the loosely-coupled communications;

wherein the system further comprises a routing module configured to route calls away from tenant unaware execution nodes and instead to one or more tenant-specific execution node instances;

wherein at least some of the source computing systems and at least some of the sink computing systems are external to the cloud-inclusive integration system; and wherein the event channel is deployed to the integration system, wherein received events are generated by the cloud-based event driven integration information processing system to (a) transform, normalize, and replace point-to-point integration patterns to decouple data producers and data consumers that otherwise would be linked together via those point-to-point integration patterns, and (b) allow tenant-aware integration patterns to generically plug into the cloud-based event driven integration information processing system.

13. The system of claim 12, wherein the event sink definitions are tenant specific.

14. The system of claim 12, further comprising a plurality of rendering nodes configured to generate tenant-specific user interface instances, the user interface being programmed to enable a user to define a new event type, and associate source and/or sink computing systems with the newly defined event type.

15. The system of claim 12, wherein events from the event channel are communicable to the sink computing systems via push, pull, and direct event models.

16. The system of claim 12, wherein the processing resources are provided in connection with adapters of the sink computing systems.

* * * * *